United States Patent
Beimers et al.

(10) Patent No.: US 6,825,919 B2
(45) Date of Patent: Nov. 30, 2004

(54) HANDHELD COLOR MEASUREMENT INSTRUMENT

(75) Inventors: Daniel J. Beimers, Kentwood, MI (US); David A. Meekhof, Grand Rapids, MI (US); Iain T. Pike, Grand Rapids, MI (US)

(73) Assignee: X-Rite, Incorporated, Grandville, MI (US)

(*) Notice: Subject to any disclaimer, the term of this patent is extended or adjusted under 35 U.S.C. 154(b) by 0 days.

(21) Appl. No.: 10/417,365

(22) Filed: Apr. 16, 2003

(65) Prior Publication Data

US 2003/0202183 A1 Oct. 30, 2003

Related U.S. Application Data

(63) Continuation of application No. 09/776,019, filed on Feb. 2, 2001, now abandoned.
(60) Provisional application No. 60/180,242, filed on Feb. 4, 2000, and provisional application No. 60/204,090, filed on May 15, 2000.

(51) Int. Cl.$^7$ .............................................. G01N 21/00
(52) U.S. Cl. .................... 356/72; 356/402; 235/462.13
(58) Field of Search .................... 356/72, 402, 406, 356/407, 419; 235/462.04, 462.13, 462.15

(56) References Cited

U.S. PATENT DOCUMENTS

| | | | |
|---|---|---|---|
| 4,591,978 A | 5/1986 | Peterson et al. | 710/14 |
| 4,645,350 A | 2/1987 | Weidmann et al. | 356/418 |
| 4,671,661 A | 6/1987 | Ott | 356/402 |
| 4,825,058 A | 4/1989 | Poland | 235/383 |
| 5,062,714 A | 11/1991 | Peterson et al. | 356/406 |
| 5,118,183 A | 6/1992 | Cargill et al. | 356/73 |
| 5,272,518 A | 12/1993 | Vincent | 356/405 |
| 5,373,364 A | 12/1994 | Krzyminski | 356/405 |
| 5,400,138 A | 3/1995 | Peterson et al. | 356/319 |
| 5,701,175 A | 12/1997 | Kostizak et al. | 356/326 |
| 5,754,283 A | 5/1998 | Keane et al. | 356/73 |
| 5,825,486 A | 10/1998 | Zavislan et al. | 356/326 |
| 5,963,333 A | 10/1999 | Walowit et al. | 356/425 |
| 5,986,769 A | 11/1999 | Krzyminski | 356/445 |
| 6,062,481 A | 5/2000 | Storch et al. | 235/494 |
| 6,147,761 A | 11/2000 | Walowit et al. | 356/425 |

FOREIGN PATENT DOCUMENTS

| | | |
|---|---|---|
| DE | 3723701 | 2/1989 |
| DE | 4318637 | 6/1994 |
| DE | 4305968 | 4/1996 |
| DE | 19722073 | 3/1998 |
| DE | 19633557 | 5/1998 |
| DE | 19716066 | 9/1998 |
| EP | 0171360 | 1/1986 |
| EP | 0353842 | 2/1990 |
| WO | WO0042595 | 7/2000 |

OTHER PUBLICATIONS

X-Rite DTP Series, Auto Scan Densitometer & Colorimeter RCI Manual, 1996.
Description of Proposed ISS: Ultra Code, downloaded from www.aimglobal.org/standards/symbinfo/ultracode_overview.htm, Feb. 9, 2004.
Barnes, Dean et al, Two Dimensional Bar Coding, Purdue University, Tech 621, Spring 1999.

Primary Examiner—Thong Nguyen
Assistant Examiner—Arnel C. Lavarias
(74) Attorney, Agent, or Firm—Warner Norcross & Judd

(57) ABSTRACT

A handheld color measurement instrument capable of reading both barcodes and sample colors. The instrument includes a single color measurement engine connected to a control capable of detecting and reading barcodes. When a barcode is detected, the control updates program and/or configuration information in accordance with information contained in the barcode. When a barcode is not detected, the control operates to read sample colors.

15 Claims, 14 Drawing Sheets

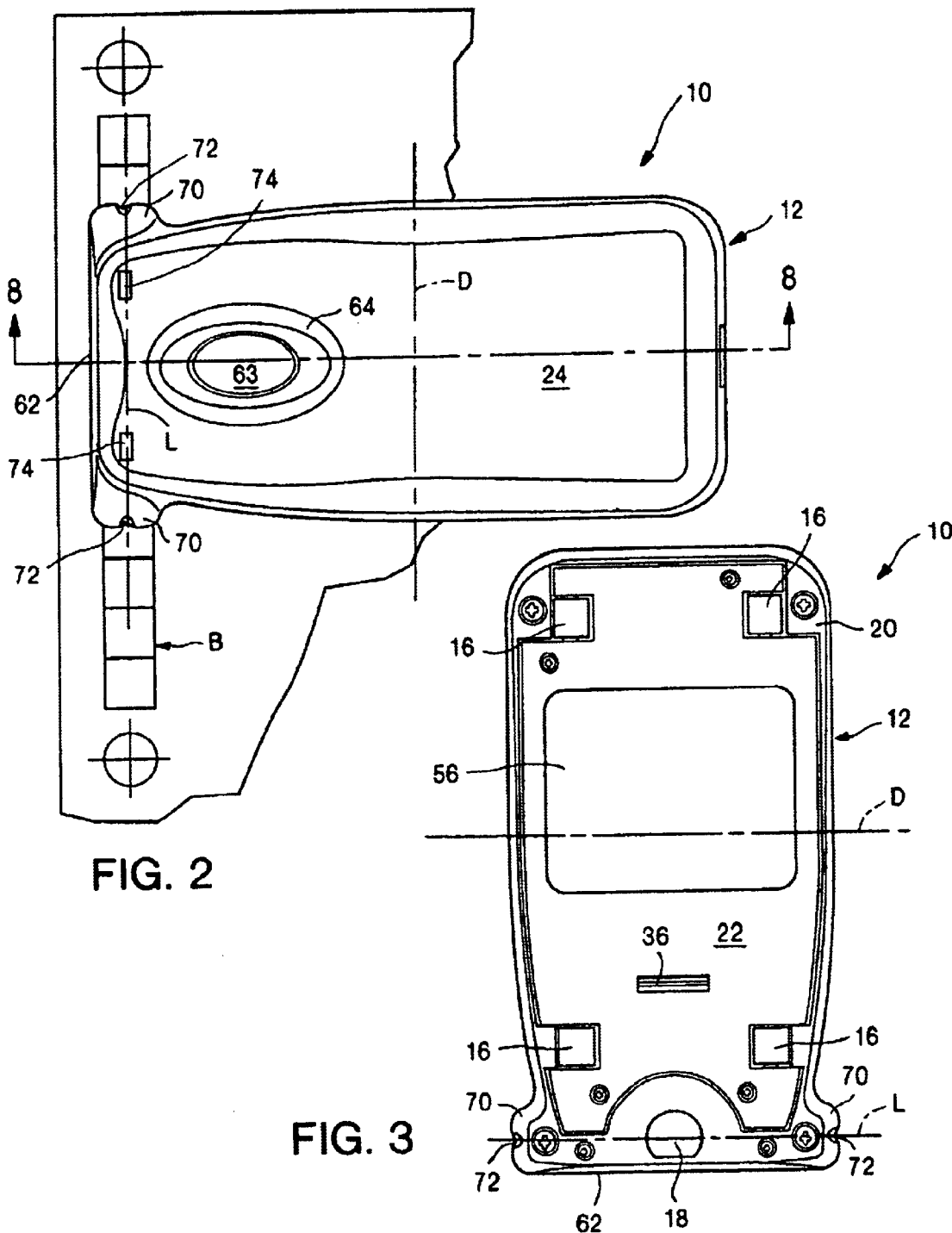

HANDHELD COLOR MEASUREMENT INSTRUMENT

I. Priority Claim

This application claims the benefit of U.S. Provisional Application Ser. No. 60/180,242 filed Feb. 4, 2000 entitled "Handheld Color Measurement Instrument" and U.S. Provisional Application No. 60/204,090 filed May 15, 2000 entitled "Programmable Handheld Color Measurement Instrument". This application is a continuation of U.S. application Ser. No. 09/776,019 entitled, "Handheld Color Measurement Instrument," filed Feb. 2, 2001, now abandoned.

Background of the Invention

II. Field of the Invention

The present invention relates to color measurement instruments, and more particularly to handheld color measurement instruments.

III. DESCRIPTION OF THE ART

Color measurement instruments are capable of reading colors for the subsequent conversion of the colors to a mathematical representation. That representation can be processed using techniques known to those skilled in the art to perform color functions. Color measurement instruments include, by way of illustration and not limitation, spectrophotometers, colorimeters, densitometers, and spectroradiometers.

A handheld color measurement instrument is disclosed in U.S. Pat. No. 5,986,769 issued Nov. 16, 1999 to Krzyminski and entitled "Hand-Held Instrument for Reflection Measuring on Printed Sheets and Test Charts." This instrument is used in reading "color bars" on printed sheets. While providing a certain level of convenience and accuracy, this scanner is not without its drawbacks. First, the instrument requires a handheld rule to guide the instrument along a linear path. Second, the instrument appears to include a single photodetector. Third, the space required by the encoder wheel limits the positioning of the support wheels.

Color measurement instruments, especially the handheld type, have limited input devices. Typically, input is limited to a few keys, or even a single key. Consequently, such instruments are programmed and configured by (a) connecting the instrument to a personal computer (PC), for example, through a serial or USB connection, (b) inputting programming and configuring commands into the PC, and (3) communicating the commands from the PC to the instrument. Such an approach is more cumbersome and time-consuming than is desired by some operators of the instruments.

SUMMARY OF THE INVENTION

The aforementioned problems are overcome in the present invention wherein a handheld color measurement instrument is provided with improved functionality and ease of use.

In a first aspect of the invention, the instrument includes support rollers that guide movement of the instrument on a surface in a linear direction. The instrument includes a color measurement engine having an aperture opening through the bottom of the instrument. Consequently, the aperture scans along a line as the instrument is rolled over a surface such as a printed sheet.

In a first variation of the first aspect, the instrument housing includes line-defining elements for defining a visual line that is parallel to the linear direction of travel and that is aligned with the scanning aperture. The elements can be one or more of wings on the housing, notches in the housing, or lights supported by the housing. The line-defining elements assist in aligning the instrument with a target for accurate scanning.

In a second variation of the first aspect, the instrument is a densitometer including a blunt nose, and the scanning aperture is located proximate the nose. A plurality of photodetectors are arranged in an arcuate configuration about the scanning aperture. No photodetector is closer to the blunt nose than the scanning aperture. Consequently, the photodetectors do not interfere with placement of the aperture closely proximate the blunt nose of the instrument.

In a third variation of the first aspect, rolling support elements and an encoder wheel are mounted in the bottom of the instrument. The support wheels are proximate the perimeter of the bottom of the instrument. By separating the rolling support elements from one another as much as possible (i.e. positioning them proximate the perimeter of the bottom), the tracking of the instrument is improved. The encoder wheel is positioned interiorly of the support elements, where room is available for the entire encoder assembly.

In a fourth variation of the first aspect, the single color measurement engine within the instrument is capable of reading both barcodes and color bars or other targets. Consequently, the instrument can be used to read barcode information, for example, to configure the instrument. The instrument does not require a separate optical mechanism for reading the barcodes.

In a second aspect of the invention, the instrument can be programmed and/or configured by reading barcodes using the color measurement engine. More specifically, the instrument includes a housing, a color engine, and a control (e.g. a microprocessor) within the housing. The control is coupled to the engine and is capable of detecting and reading barcodes. Accordingly, programming and/or configuration information can be inputted into the instrument through barcodes. Such inputting is easy, accurate, and fast. When the instrument does not detect barcodes, the instrument performs color measurement functions (e.g. as described above).

These and other objects, advantages, and features of the invention will be more readily understood and appreciated by reference to the detailed description of the preferred embodiment and the drawings.

BRIEF DESCRIPTION OF THE DRAWINGS

FIG. 2 is a top plan view of the instrument scanning the color bar;

FIG. 3 is a bottom plan view of the instrument;

DETAILED DESCRIPTION OF THE PREFERRED EMBODIMENT

Figure 1:
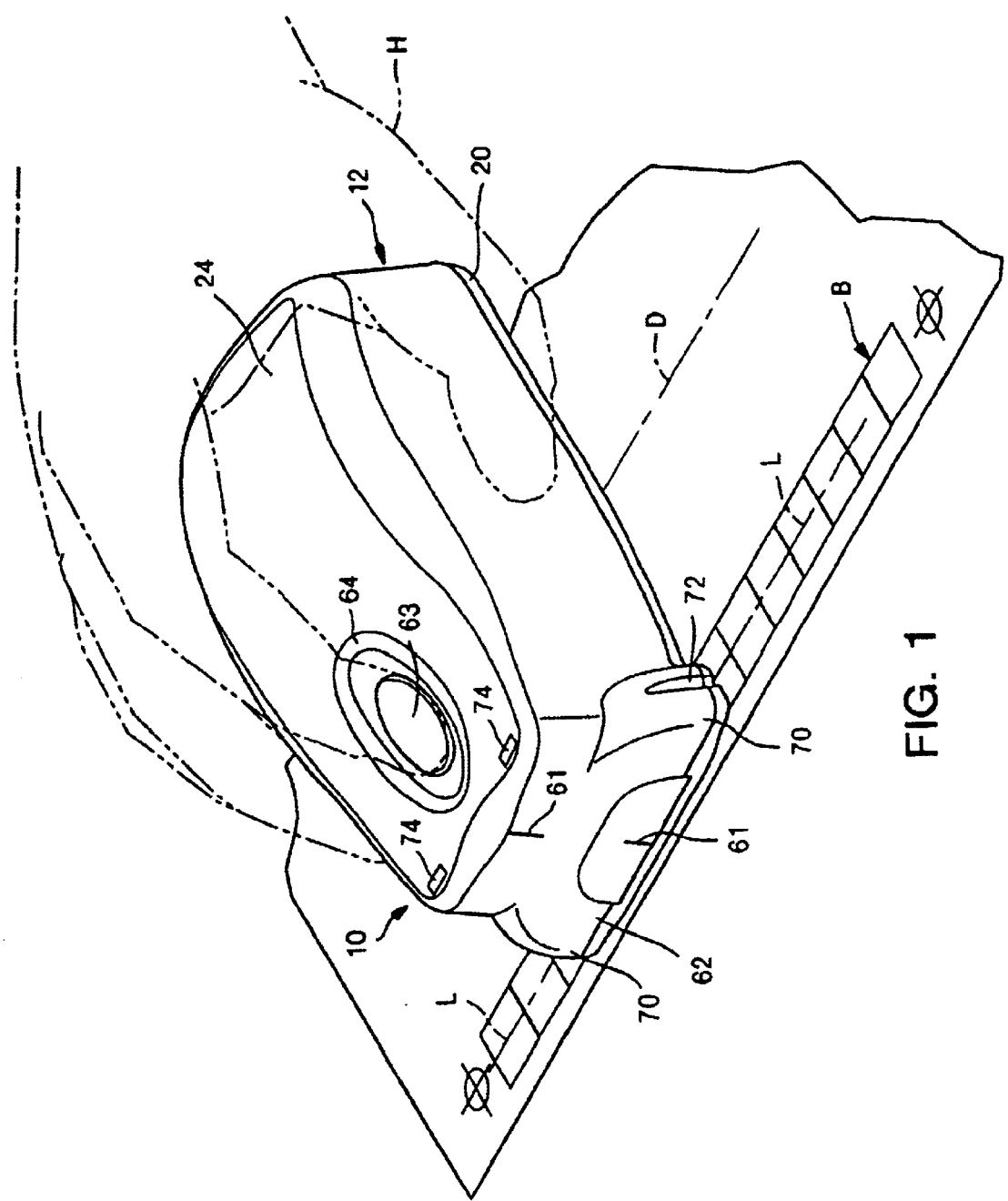
FIG. 1 is a perspective view of the color measurement instrument of the present invention scanning a color bar on a printed sheet.

A handheld color measurement instrument constructed in accordance with a preferred embodiment of the invention is illustrated in the drawings and generally designated 10. The instrument includes a housing 12 (FIGS. 1–3) and a color measurement engine or optics assembly 14 (FIGS. 4–8). The housing includes a plurality of rollers 16 (FIGS. 3–5) to support the housing 12 for rolling movement in a linear direction D. The optics assembly 14 includes an aperture 18 opening through the bottom of the housing. When the instrument is rolled across a surface such as a printed sheet, the aperture scans along a linear path such as a color bar B.

The disclosed instrument 10 is a densitometer. Alternatively, the instrument could be any color measurement instrument such as a spectrophotometer or calorimeter.

I. Housing

The housing 12 includes a base plate 20, a heat sink 22, and a cover 24.

The base plate 20 is the frame component on which the remaining elements are supported. In the preferred embodiment, the base plate 20 is fabricated of plastic. Alternatively, the base plate may be fabricated of any suitable material.

The base plate 20 includes an optics socket 30 for the optics assembly, a plurality of roller sockets 32, and an encoder socket 34. The optics socket 30 is configured to receive the optic assembly 14. The roller sockets 32 receive the support rollers 16 in a snap-fit fashion. The rollers 16 are free to rotate within the sockets 32 after being mounted therein. Similarly, the encoder wheel socket 34 receives the encoder wheel 36 in snap-fit fashion. The encoder wheel is also free to rotate after assembly.

The encoder wheel 36 is coupled in conventional fashion to an encoder (not shown) of the type generally well known to those skilled in the art. As perhaps best illustrated in FIG. 3, the wheel 36 is proximate the front rollers 16 and the aperture 18. As used in this context, proximate means that the distance between the wheel 36 and aperture 18 is no more than one-half, and preferably no more than one-third, of the length of the instrument 10. The proximity of the wheel 36 to the aperture 18 improves the correspondence between the distance measured by the encoder and the distance covered by the aperture.

The base plate 20 further includes front mounting bosses 40 and rear mounting bosses 42 for properly registering and securing the cover 24 to the base plate 20 using fasteners (visible only in FIG. 3). The plate 20 further defines apertures 44 for receiving fasteners (visible only in FIG. 3) intersecuring the heat sink 22 and the optics assembly 14 to provide a thermal path between the optics assembly and the heat sink. The plate 20 further defines apertures 46 for receiving fasteners (visible only in FIG. 3) for securing the heat sink 22 to the bottom of the plate.

As perhaps best illustrated in FIG. 3, the support rollers 16 are located proximate the perimeter of the housing 12 or base 20. The tracking of the instrument is enhanced by positioning the rollers as far apart from one another as possible. This is similar to improving the tracking of an automotive vehicle by having a wide wheel base. The axis of rotation of all of the rollers 16 are parallel to one another. Consequently, the instrument 10 tracks in a linear direction D generally perpendicular to the axes of rotation of the rollers. In the currently preferred embodiment, the rollers 16 on each side of the instrument 10 are substantially co-axial with one another. However, non-co-axial roller placements are also within the scope of the present invention, and may be desirable in view of instrument geometry due to functional and/or decorative considerations.

Figure 4:
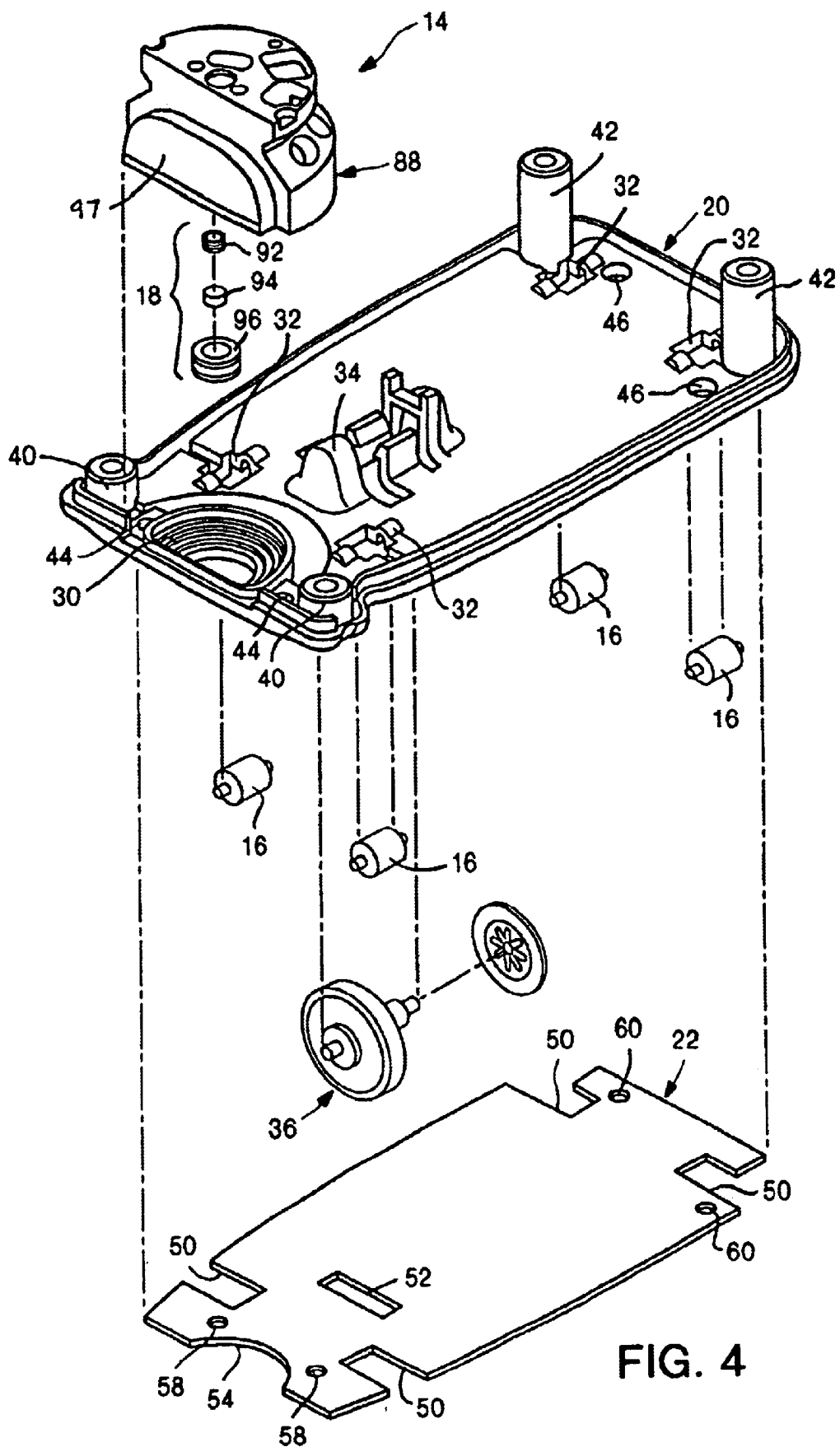
FIG. 4 is an upper perspective exploded view of the instrument with the cover removed.
Figure 5:
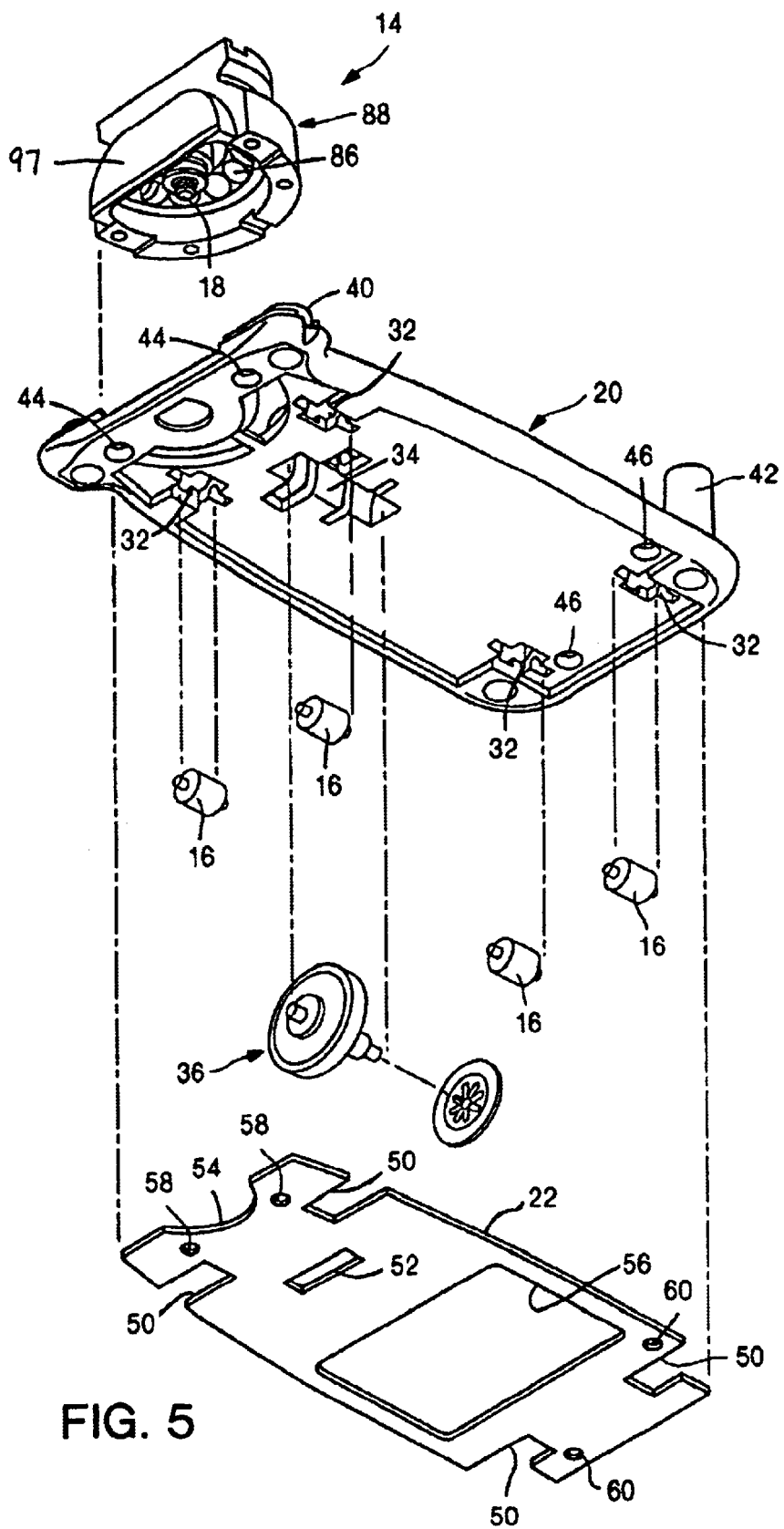
FIG. 5 is a bottom perspective exploded view of the instrument with the cover removed.

The heat sink 22 is included to dissipate heat generated by the optics assembly 14. As seen in FIGS. 3–5, the heat sink 22 is configured to have a perimeter generally similar to the perimeter of the base plate 20. The heat sink 22 includes support wheel cut-outs 50, an encoder wheel cut-out 52, and an optics cut-out 54. The heat sink 22 also includes a recessed label area 56 within which a label (not shown) may be mounted.

The heat sink 22 further includes front apertures 58 and rear apertures 60. The front apertures 58 are aligned with the apertures 44 in the base plate 20 and the optics assembly 14, so that the heat sink may be secured to the optics assembly 14 to provide a thermal path. The rear apertures 60 are aligned with the apertures 46 in the base plate 20 enabling the heat sink 22 to be attached to the instrument.

The cover 24 (FIGS. 1–2) is designed to be easily grasped by a human hand H (FIG. 1). The design of the cover 24 is symmetrical about a longitudinal line. Therefore, the instrument 10 is unhanded. The base of the cover 24 is generally the same shape as the base plate 20 so that the cover and base plate fit neatly together when intersecured. The housing 12, including the base plate 20 and the cover 24, include a blunt nose 62. In the preferred embodiment, the nose is generally linear and planar. However, blunt has generally understood meanings broader than generally linear or planar. One or more lines 61 may be provided on the nose 62 in the form of printing, notching, or other means. Each line 61 is perpendicular to the bottom of the instrument and is aligned with the aperture 18. The lines 61 provide a visual indicator of the position of the aperture 18 to assist in taking "spot" readings (i.e. readings of a single spot without moving the instrument during the reading).

A button 63 (FIGS. 1 and 8) is located within a button recess 64 to be easily operated by the index finger (or another finger) of the operator. The button 63 is electrically connected to the internal circuitry or processor 99 of the instrument 10 (see below).

The housing 12 includes several pairs of line-defining elements or means for visually defining lines that are parallel to the linear direction of travel and that are aligned with the aperture 18. With particular reference to FIGS. 1 and 2, these line-defining means include any one of the pair of wings 70, the pair of notches 72, or the pair of light-emitting diodes (LEDs) 74. Each of these pairs defines a line L parallel to the direction of travel D and aligned with the aperture 18. Consequently, the pairs of line-defining elements enable the operator to visually align the instrument 10 for linear scanning along a color bar B or other color target.

II. Optics Assembly

Figure 7:
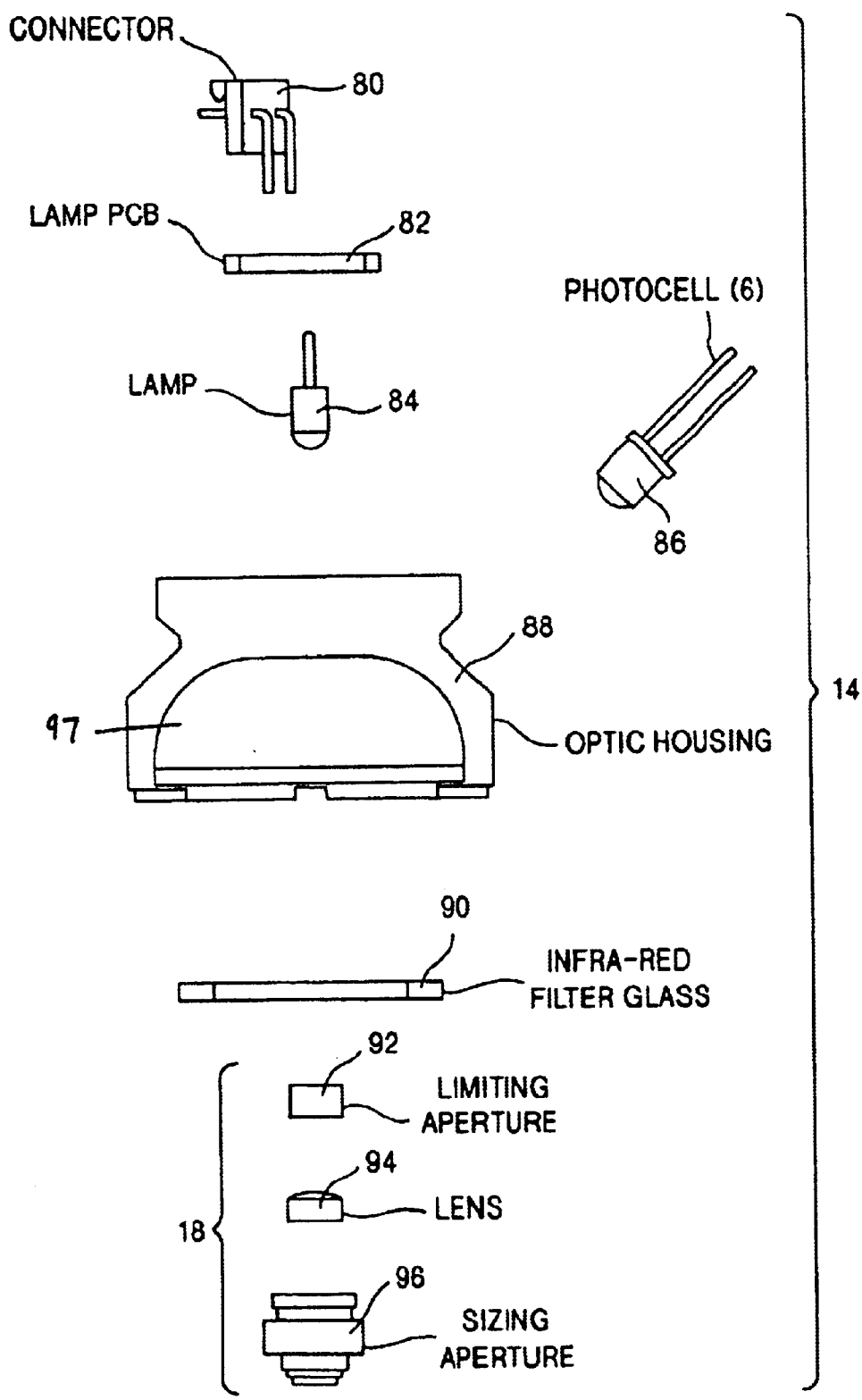
FIG. 7 is a side exploded view of the optics assembly.
Figure 8:
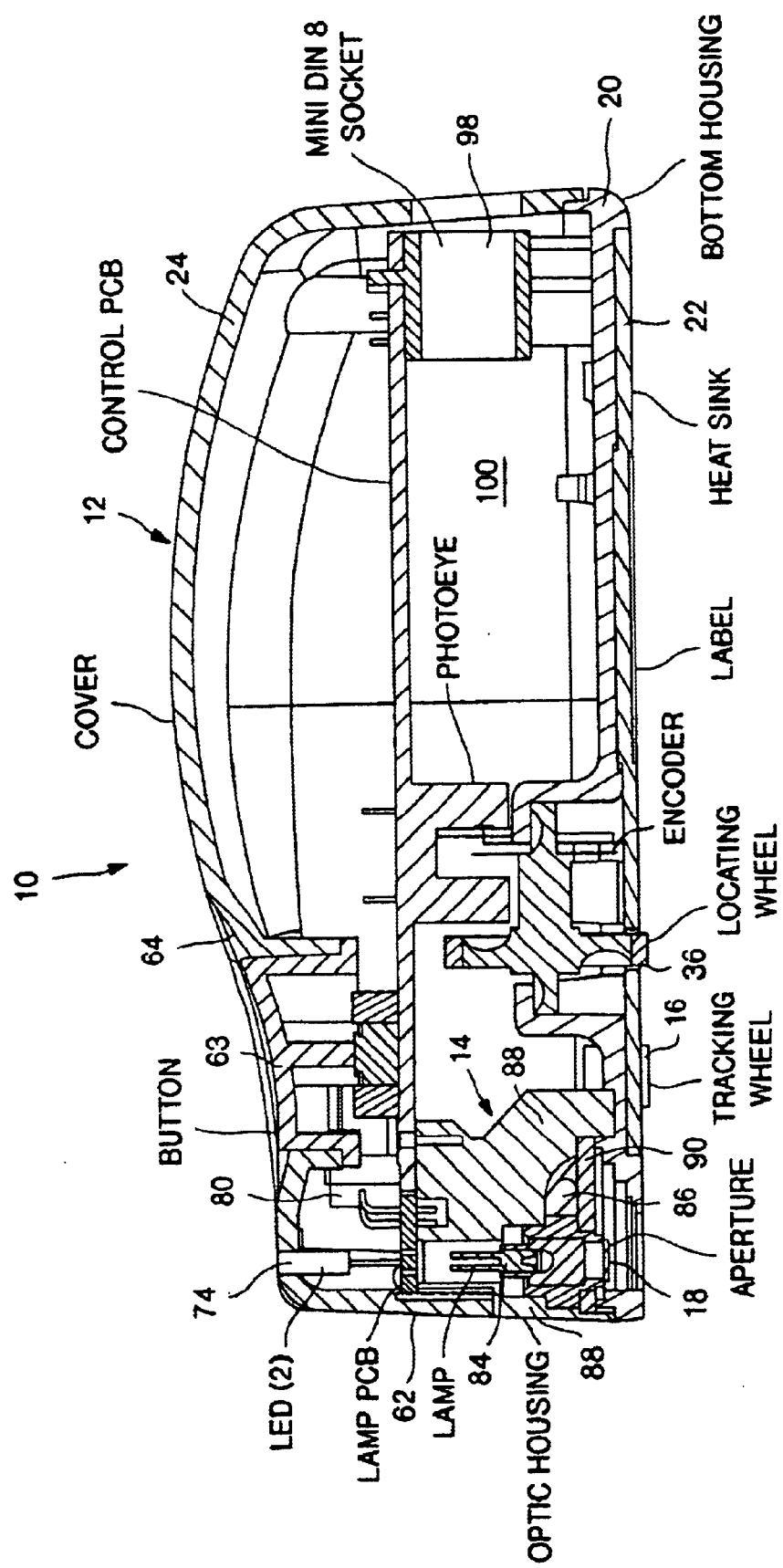
FIG. 8 is a sectional view through the instrument taken along line 8—8 in FIG. 2.

The optics assembly or color measurement engine 14 includes (from top to bottom as illustrated in FIG. 7) a connector 80, a lamp printed circuit board (PCB) 82, a lamp 84, a plurality of photocells or photodetectors 86, a housing 88, an infrared filter 90, a limiting aperture 92, a lens 94, and a sizing aperture 96. The last three elements are collectively referred to as the aperture or aperture assembly 18.

Figure 6:
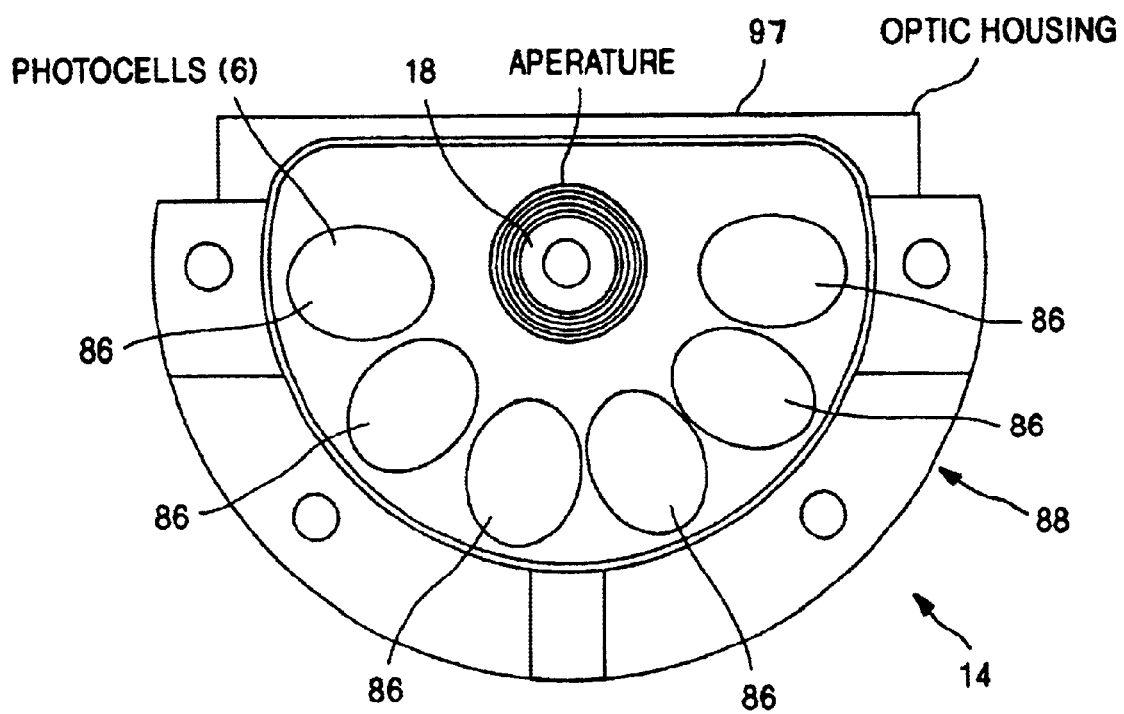
FIG. 6 is a bottom view of the optics assembly.

The housing 88 is D-shaped (see FIG. 6). The D shape includes a flat surface 97 which abuts the blunt nose 62 of the housing 12 within the assembled instrument. This enables the optics assembly 14 to be positioned as far forward within the housing 12 as possible while still providing a plurality of photodetectors 86 in the assembly.

The infrared filter glass 90 is well known to those skilled in the art and is included to block infrared (IR) radiation from reaching the photocells 86. All of the elements within the aperture or aperture assembly 18 also are generally known to those skilled in the art.

Both the lamp 84 and the connector 80 are mounted on the PCB 82 in conventional fashion. The lamp or illuminator is generally known to those skilled in the art and in the preferred embodiment is a tungsten/halogen (i.e. tungsten filament and halogen gas) lamp.

The photocells 86 are mounted in a semicircular configuration about the aperture 18. Because the instrument is a densitometer, the photocells are selected to be sensitive to one of the colors of cyan, magenta, and yellow to provide an ANSI/ISO Status T system response. A pair of photocells responsive to each color are arranged at 90° to one another. This approach enhances (over a single photocell) the accuracy and averaging of detected color by increasing the signal and by reducing orientation variation due to, for example, the grain of the media. Other responses and detector configurations are within the scope of the invention.

III. Control

Figure 25:
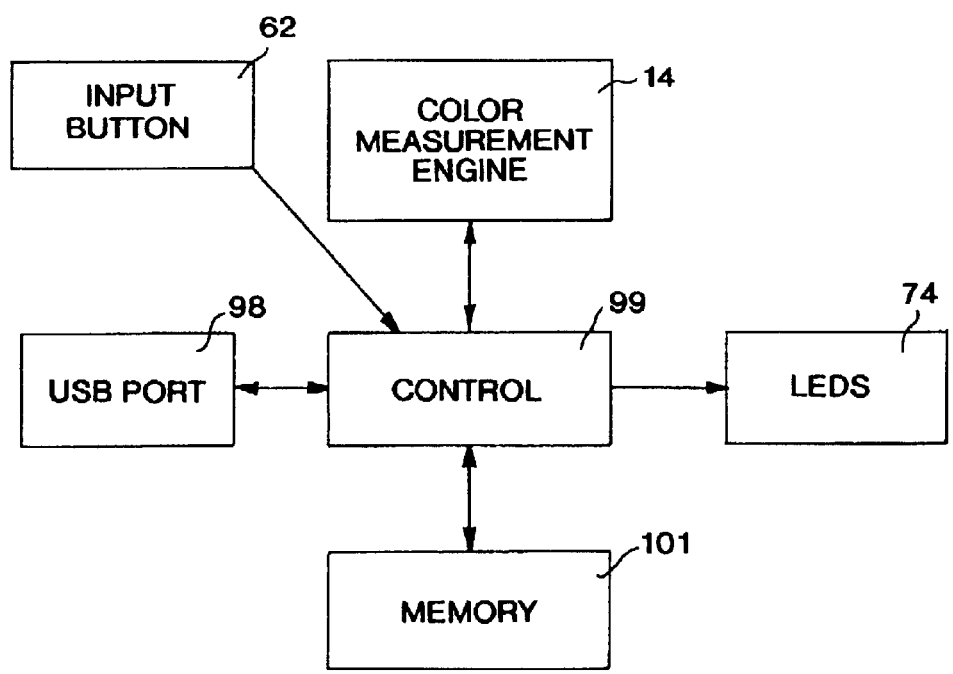
FIG. 25 is a schematic diagram of the control and communication components of the instrument.

As illustrated in FIG. 25, the instrument 10 includes a computer processor, control, or other processing means 99 for controlling the operation of the instrument and for interfacing the instrument with a computer. The instrument also includes EEPROM memory 101 for storing memory information such as programming information and/or configuration information. The processor and memory are generally known to those skilled in the art, and therefore need not be described in detail. The processor or control 99 and the memory 101 are located in the area 100 (see FIG. 8) and include appropriate communication connections with the engine 14, the input button 63, the LEDs 74, and the communication socket or port 98.

The instrument 10 may include both USB (Universal Serial Bus) and serial (e.g. RS232) capability, for example, as disclosed in U.S. patent application Ser. No. 09/411,484 filed Oct. 1, 1999 and entitled "Color Measurement Instrument with Multiple Protocol Interface". Additionally, the instrument may include Internet, wireless, and/or other communication capabilities.

In view of the disclosure of this application, the specific programming of the control 99 is well within the capabilities of one skilled in the programming art, and therefore need not be set forth in detail.

IV. Operation

The instrument 10 is easily used as a hand-held color measurement device. A cord (not illustrated) interconnects the instrument 10 with a personal computer or other device (also not illustrated). Specifically, the cord is connected to the instrument 10 via the socket 98.

To scan a color bar, the instrument is grasped with the hand much as a computer mouse would be. The instrument is positioned so as to be aligned for linear scanning across a color bar B. All of the line-defining elements facilitate the proper alignment of the instrument 10 with the color bar B. As noted above, those devices include the wings 70, the notches 72, and the LEDs 74. The user then depresses the button 63 and rolls the instrument 10 along the color bar B. When scanning is complete, the user releases button 63. Because the rollers 16 guide the instrument 10 along a linear path D, the instrument 10 tracks along the color bar if properly initially aligned. Only minimal, if any, corrective guidance is required by the user when scanning the color bar B.

The densitometric operation of the instrument 10 is well known to those skilled in the art. Consequently, a detailed description is not necessary. Suffice it to say that the photocells 86 detect the light reflected from various locations along the color bar so that the processor (not illustrated) can convert the photodetector outputs into a mathematical representation of the scanned color.

The instrument 10 can also be configured, reconfigured, or otherwise programmed using barcode information. In doing so, a barcode set-up sheet or sheets are provided by the manufacturer of the instrument. The sheet or sheets include custom barcode information for configuring the parameters, including but not limited to the following:

Baud Rate

Separator (the character that appears between the data fields)

Delimiter (the character that indicates the end of a line)

Decimal point (can be turned on or off)

Auto Transmit (data automatically transmitted after a measurement is complete)

Data After Pass (transmits data after each pass [as opposed to collecting all data And transmitting only when all passes have been measured])

Min/Max (includes Min/Max information for selected strip data)

Times-10 (adds extra digit of precision to measured data)

Instrument Type

Turning more specifically to the configuration of the instrument using barcodes, the following description is provided.

The barcode system comprises a specially designed barcode format which is printed on the sample to be measured by the pattern recognition firmware. This system uses existing densitometer optics for reading the barcodes, eliminating the need for additional barcode reader hardware. The barcodes are imaged in the measurement path, allowing the instrument 10 to measure the color patches and read the barcode with a single pass. The internal pattern recognition algorithms distinguish between the sample area and the barcode area, and handle each appropriately.

These barcodes have a number of uses, including but not limited to the following:

1) Instrument calibration: The calibration values may be encoded on the calibration strip along with the patches to be measured. This allows the user to calibrate the unit with a single pass without having to enter calibration values manually.

2) Strip identification: Barcodes may be imaged along with the color patches to be measured. This allows strips to be tagged with an identifier code. This code can be used for lot or batch identification, verification of the correct strip, or any other use which could use a small amount of information along with the measured color data.

3) Unit configuration: A barcode or series of barcodes may be set up to allow the instrument to be configured without requiring the use of external computers and software. The firmware in the instrument is configured to recognize certain sequences of barcodes. These sequences may then correspond to internal configuration settings. Moving the unit over the properly sequenced barcode causes it to change its internal configuration to match the desired settings encoded into the barcode. The set of configuration barcodes can be printed in a user manual along with text describing each barcode's function.

Because these barcodes are read with the same optics used to measure the color patches and not with a dedicated barcode reader, their format differs greatly from any of the established bar coding methods (such as used on UPC symbols). The method minimizes the amount of linear space required for 8 bits of information while allowing for differing media contrast ratios and varying strip travel speeds. The measurements given are optimized for the size of the aperture in the optics and the range of travel speeds with which the barcodes are measured. Although this description specifies using black and white to encode the barcodes, and because the instrument measures the three color channels simultaneously, the methods described herein can readily be extended to use bar codes having a plurality of portions each of a different or unique color to increase the amount of encoded information. When so configured, the control 99 is capable of reading the information contained within each of the different colored barcode portions.

The basic barcode format is as follows: 1 start bit, 8 data bits encoded least significant bit first (nearest the start bit), and 1 stop bit. The barcode is scanned in the direction such that the start bit is the first end to be read. Logic 1 is defined as a black area or area of maximum density. Logic 0 is defined as a white area or area of minimum density. It is important that the density of the logic 1 patches be as close as possible to the maximum density (D-Max) found anywhere along the read path and that the density of logic 0 be as close as possible to the minimum density (D-Min) found anywhere along the read path. Anything other than D-Max or D-Min may render the barcode unrecognizable.

The start bit is 0.4 inches (10 mm) in length and is composed of 0.1 inches (2.5 mm) of D-Min followed by 0.3 inches (7.5 mm) of D-Max.

Figure 9:
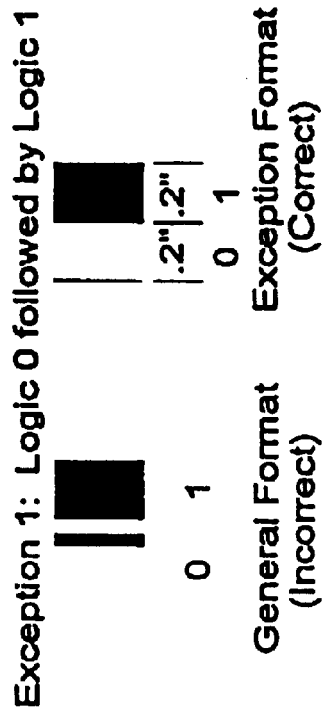
FIGS. 9–13 illustrate acceptable and unacceptable barcodes for use in conjunction with the instrument.
Figure 10:
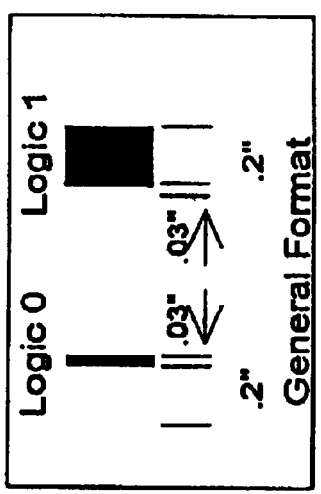

Each data bit is 0.2 inches (5 mm) in length. Bits are encoded in a modified Manchester format, where each bit is composed of a D-Min area followed by a D-Max area. The state of an individual bit is determined by the ratio of the length measurements of D-Min to D-Max, where a bit composed of mostly D-Min area is considered Logic 0 and a bit composed of mostly D-Max area is considered Logic 1. To minimize the number of light/dark transitions and to maximize the size of each bit, the D-Min/D-Max ratio will depend on the state of the surrounding bits. In general, Logic 0 is 0.17 inches (4.3 mm) of D-Min area followed by 0.03 inches (0.8 mm) of D-Max. Logic 1 is 0.03 inches (0.8 mm) of D-Min followed by 0.17 inches of D-Max. Exceptions to the above general rule are as follows:

If the current bit is Logic 0 and the next bit is Logic 1, the D-Max area which would have been normally a part of the current bit is omitted and the D-Min area which would have been a part of the next bit is omitted (see FIGS. 9–10).

Figure 11:
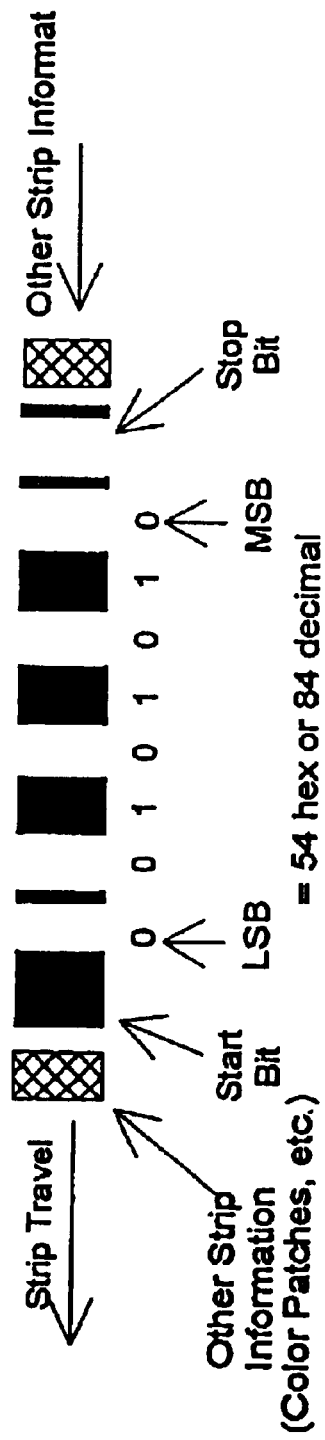

Stop Bit: The stop bit shall be a Logic 0 bit conforming to the general specification for a data bit. The D-Max portion of this bit may be a part of the surrounding D-Max area. An example of an appropriate barcode according to the described format is illustrated in FIG. 11.

Figure 12:
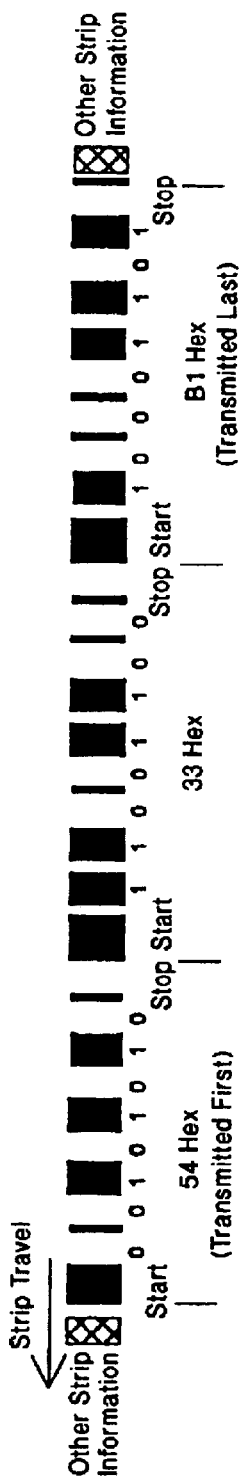

If two or more barcodes are placed end to end, the stop bit of the first barcode may be partially overlaid by the start bit of the second barcode such that white-to-dark transition in both of these bits are lined up. For example, FIG. 12 illustrates three barcodes placed end to end.

Figure 13:
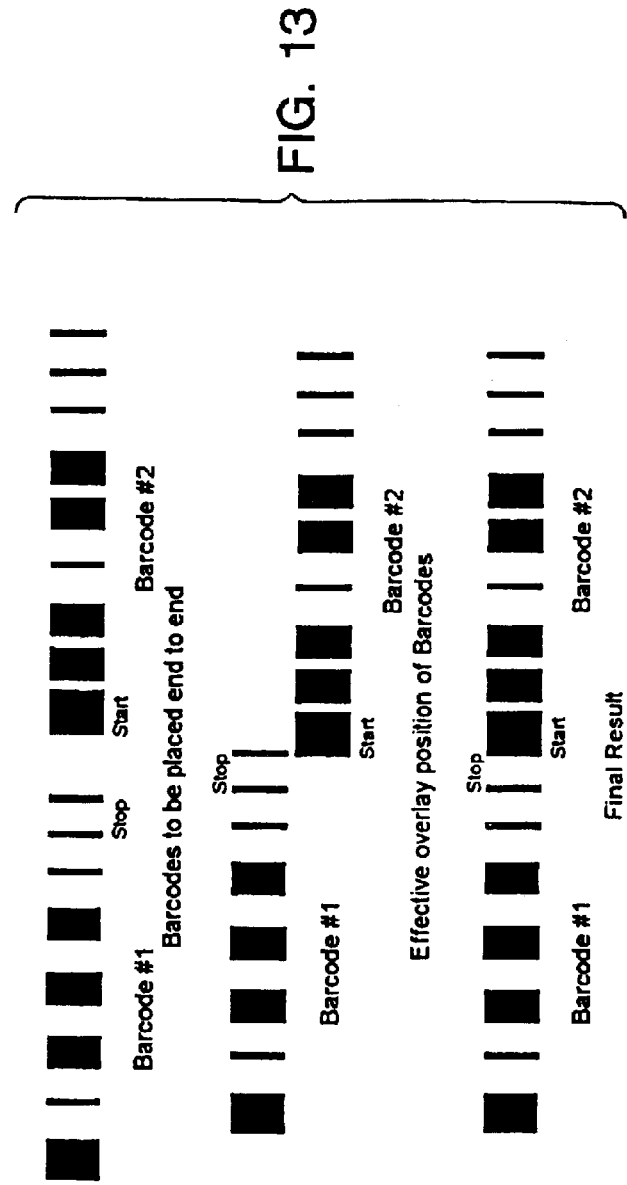
Figure 14:
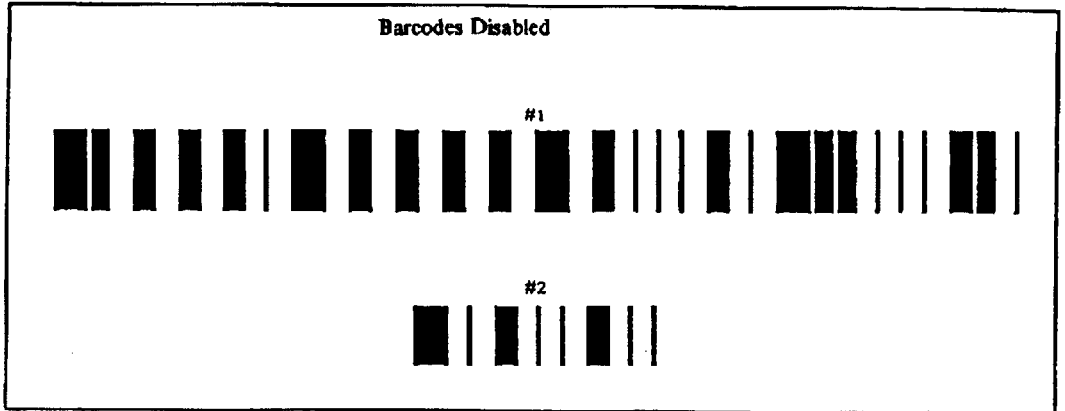
FIG. 14 shows the barcode for the Barcodes Disabled instruction.
Figure 15:
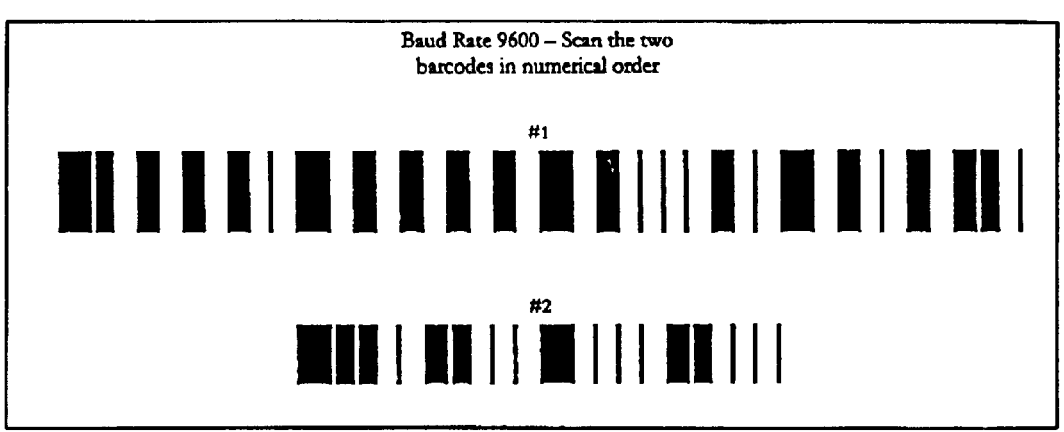
FIG. 15 shows the barcode for the Baud Rate 9600 instruction.
Figure 16:
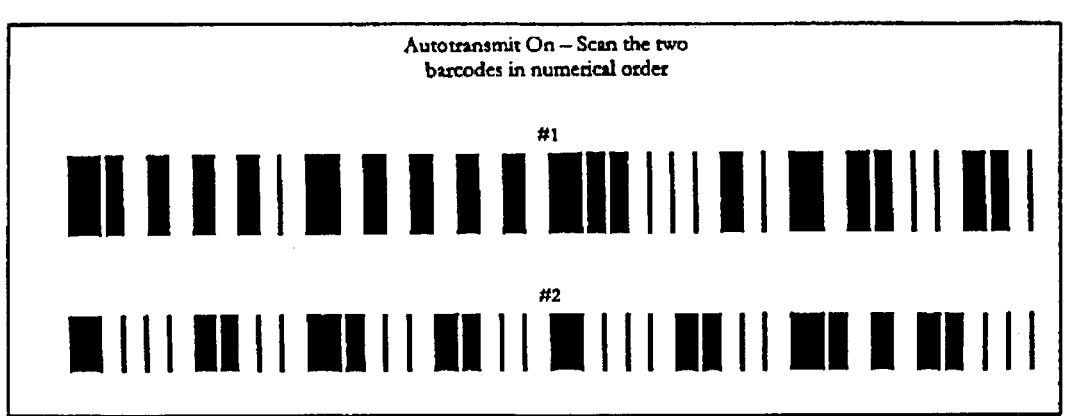
FIGS. 16–22 show the barcodes for various Configuration instructions.
Figure 17:
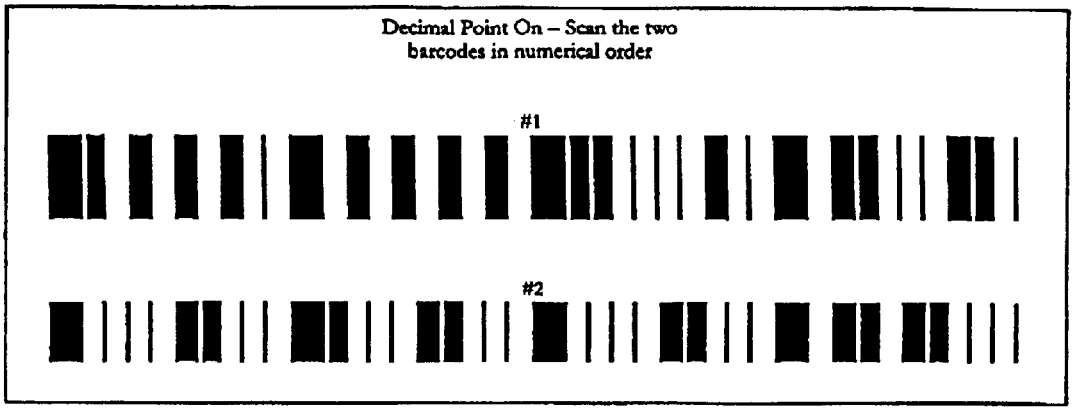
Figure 18:
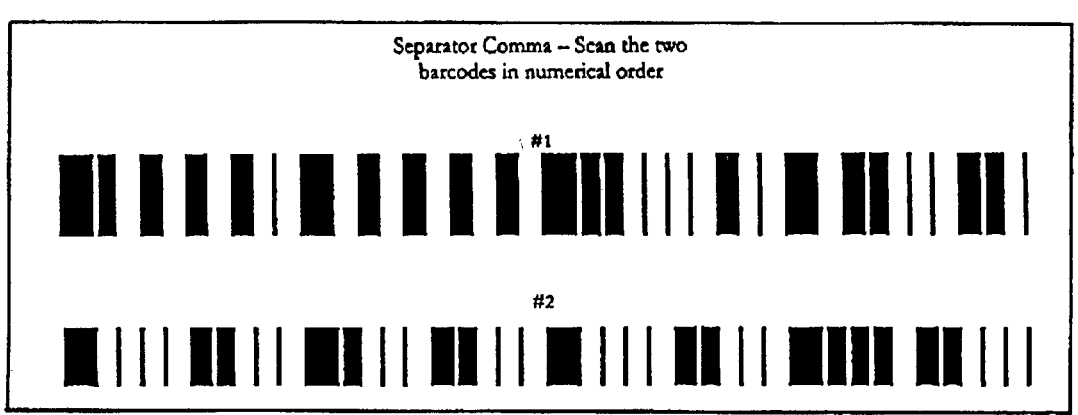
Figure 19:
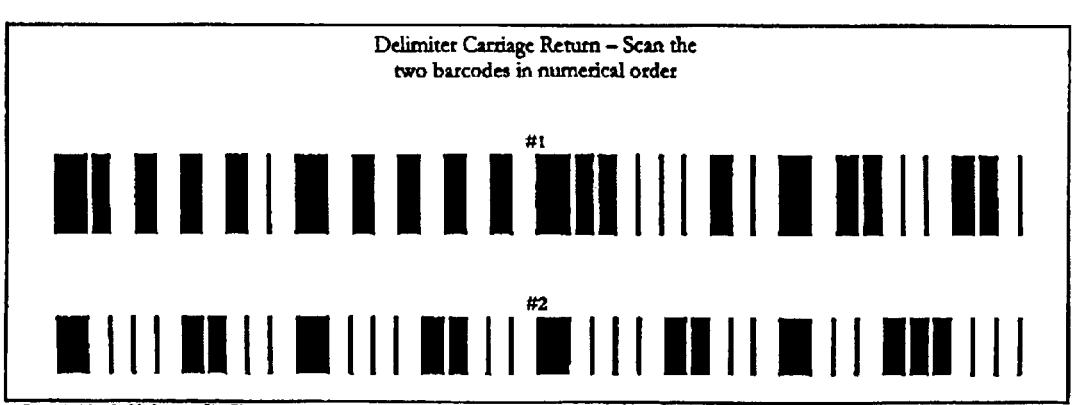
Figure 20:
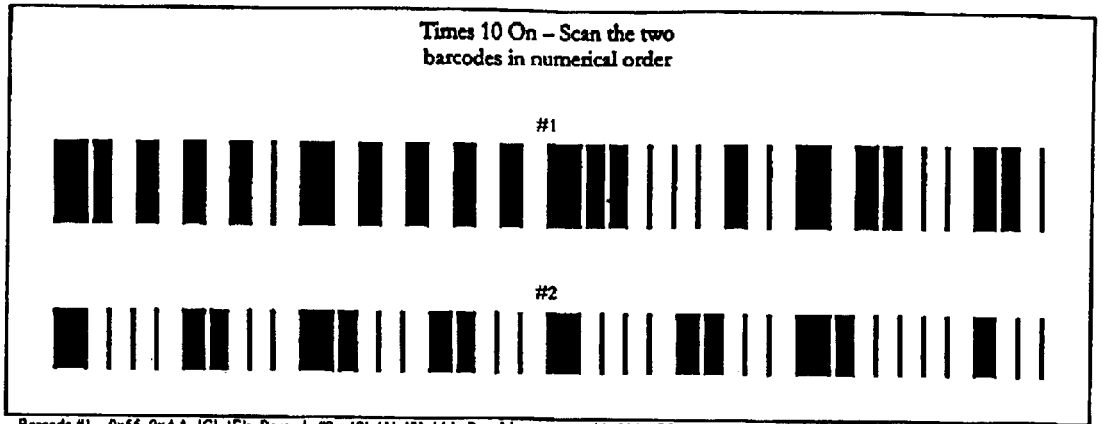
Figure 21:
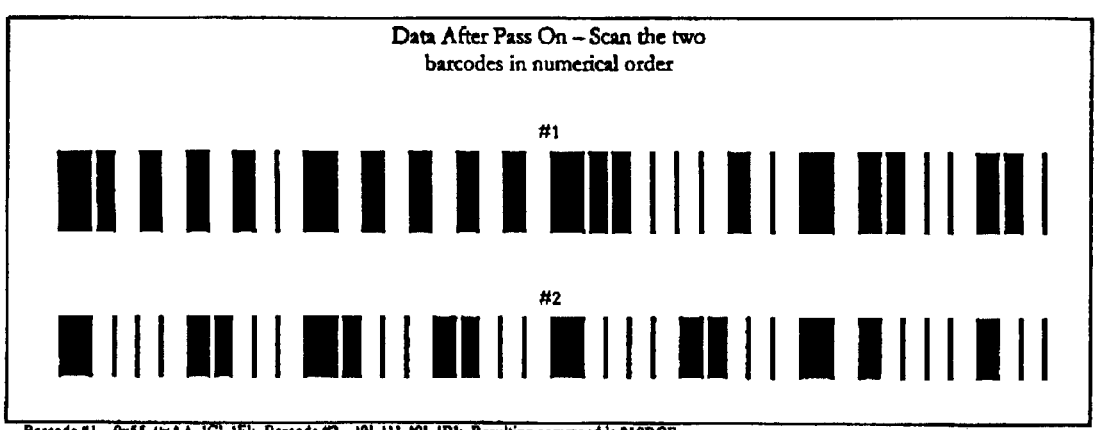
Figure 22:
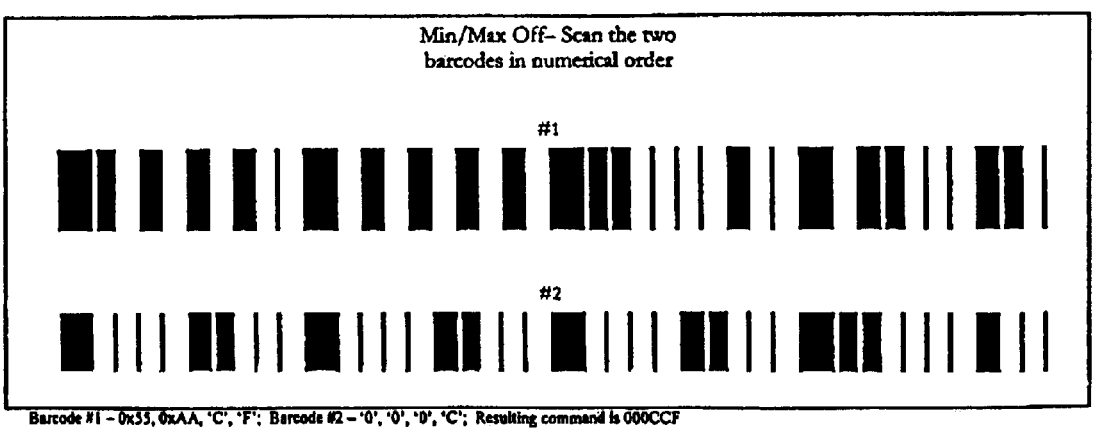
Figure 23:
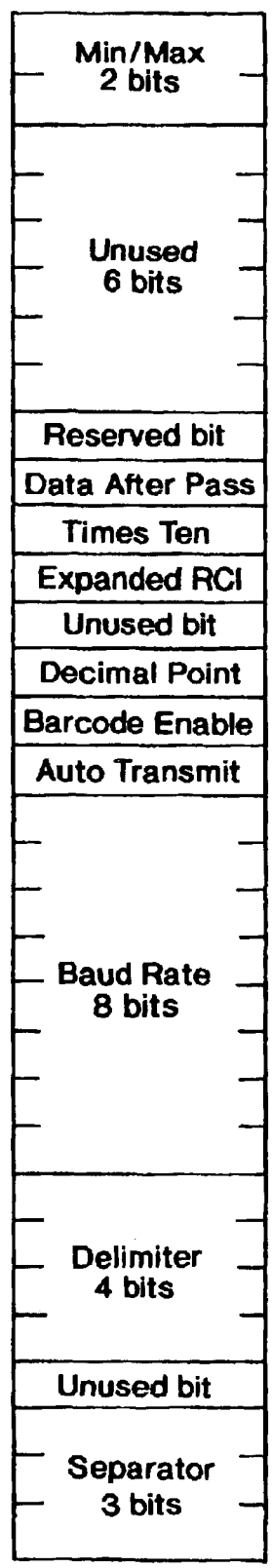
FIG. 23 is a pictorial representation of the fields within the parameter string for the Total Configuration command.
Figure 24:
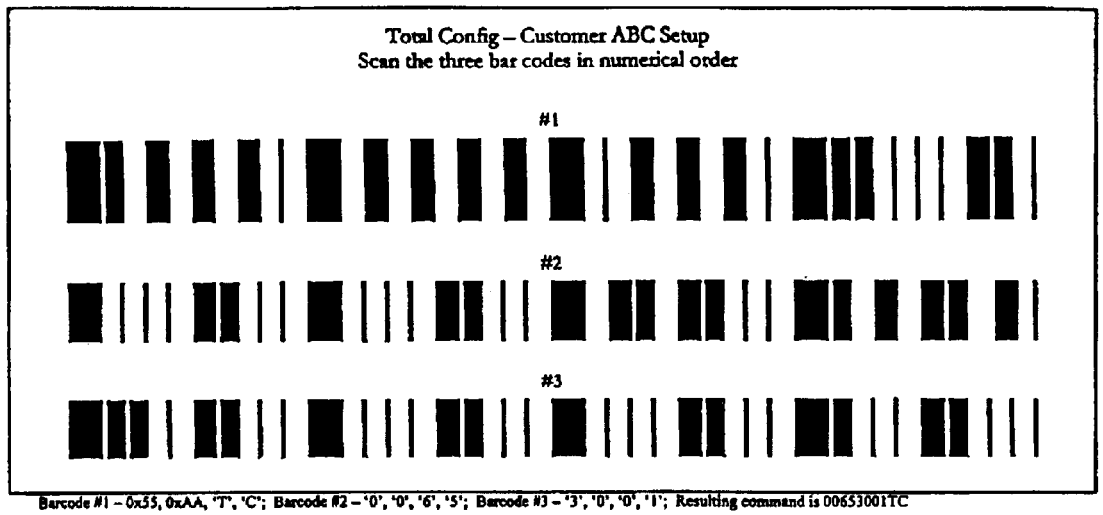
FIG. 24 shows the barcode for a Total Configuration instruction that sets all possible switches.

FIG. 13 illustrates the combining of start and stop bits of two or more barcodes.

Measurement of the barcodes is performed using the optics assembly 18 of the instrument 10. The proportional electrical signal from the photodiodes 86 is amplified and converted to binary representations by an analog to digital (A/D) converter. These binary values are stored in memory for use in the pattern recognition process. As the sample is measured, the A/D values are continuously accumulated in memory until the measurement is complete. The result is a buffer full of binary values representative of the reflected light across the sample. A mechanical distance feedback mechanism such as the rotary encoder enhances the recognition process for wide travel speed variations, but is not necessary because each bit in the barcode has a well-defined transition on both sides.

After a sample set of A/D values has been accumulated in memory, the barcode recognition process begins. For black and white barcodes, only the magenta channel is used; the data from the cyan and yellow channels are discarded. This method could however be extended to allow use of the cyan and yellow data, along with colored barcodes, to encode three times the amount of data in the same physical printed area. The method could be further extended to allow the use of combinations colors to further increase the amount of encoded information in the same physical printed area. The methods will be the same; therefore this description will concentrate only on the use of black and white barcodes.

The first step of recognition is to characterize the data. The data is searched for the value of highest reflectance and the value of lowest reflectance. Once these limits are established, two thresholds are computed, one at 20% of the maximum value, and one at 80% of the maximum value. These thresholds may vary and are set largely by the ratio of the aperture size to the size of the transition bar between two similarly valued bits in the barcode. Any A/D values less than the 20% threshold are considered logic 1 (this is low reflectance, or black), and any A/D values greater than the 80% threshold are considered logic 0 (this is high reflectance, or white). Anything between these two thresholds is considered transitional.

The next step is to scan through the entire sample set and search for the barcode patterns. This step is composed of several sub-steps. The first sub-step is to search for the start bit. This is defined simply as a given number of contiguous A/D values all being logic 1. If linear distance information is available, then the start bit is defined as a linear distance of A/D values, all being logic 1.

Once a valid start bit is found, the next sub-step is to locate 8 bits of data. The first data bit should appear immediately after the start bit, with very few transitional A/D values in between. The data bit is defined in the same manner as the start bit, but with fewer defined A/D values because of the correspondingly smaller size than the start bit. Here, logic 0 or logic 1 is allowed. Each subsequent data bit should appear with very few intervening transitional A/D samples after the prior bit. As each bit is found, its value is recorded for later use.

The last sub-step is to locate the stop-bit. This bit is defined as a data bit whose value is zero. The stop bit serves to frame the 8-bits of data properly.

If there is a failure in any one of the above sub-steps, the entire algorithm is reset, and the search for the start bit re-commences at the current A/D buffer position. Any recorded bit values are ignored. Once an entire byte is recognized, its value is stored, the algorithm is reset, and the search for the start bit re-commences at the current A/D buffer position. These steps stop once the end of data is reached.

The last major step is to use the data just acquired. The data may be used internally if it fits a defined pattern, or it may be transmitted to a host computer along with any measured strip data. In this case, it is up to the host computer to determine the purpose of the data.

V. Barcoded RCI (Remote Control Interface) Commands

In the unit 10, barcodes conforming to special formatting rules are recognized as RCI commands that are executed as if the commands had been sent over the serial port.

A. RCI Barcode Rules

The following are the formatting rules for RCI barcodes:

1) RCI commands may be encoded using as many barcodes as necessary to contain the entire command.

2) The initial barcode must be four bytes long, consisting of two binary bytes with a bit pattern of 0x55AA, followed by two ASCII bytes containing the two-character mnemonic of the intended RCI command.

3) Parameters to the command must be encoded in continuation barcodes containing the ASCII representation of the parameters.

4) All barcodes except the very last one must be exactly four bytes long.

5) All barcodes (initial and continuation) except the very last one must have the MSB (most significant bit) of the final ASCII character set to one to signal that more barcodes are necessary to complete the command.

B. Reading RCI Barcodes

When reading an RCI barcode, the LEDs 74 signal what is happening in the unit 10. While scanning the initial barcode, the LEDs 74 flash slowly between off and green— the same as any normal scan. After the unit 10 has recognized the initial barcode as being part of an RCI barcode, the LEDs 74 slowly flash between yellow and green. This flash pattern continues while scanning continuation barcodes. Upon completion of the entire RCI barcode, the LEDs 74 remain steady green, indicating a successfully completed read.

If the unit 10 detects an error while scanning a continuation barcode, the LEDs 74 flash quickly between yellow and green. In this case, the barcode scan must be started again from the beginning with the initial barcode.

If the unit 10 properly recognizes the entire barcode, but the resulting RCI command generates an error code, the error code is not processed. Instead, the LEDs 74 flash quickly between yellow and green to indicate the error.

Alternatively to the LEDs 74, or in addition to the LEDs, the signal means may include an audible, vibratory, or other human sensory signal generator (not shown). The implementation of these additional signal generators is well within the capabilities of one skilled in the art.

Although any RCI command may be encoded in barcodes and executed by scanning the barcodes, this feature is intended mainly for configuring a unit without using the socket or port 98.

C. Specific RCI Commands

Barcode Command

Mnemonic:
  BC

Usage:
  bBC<cr>

Explanation:
This command enables or disables barcode scanning. When enabled, each time a strip is read, the scanned data will be searched for barcodes. Up to five barcodes may be placed in the read path on each pass of a strip. When a barcode is recognized, its value is transmitted out through the port 98. When disabled, barcodes placed in the read path are ignored. Disabling the barcodes will reduce the processing time after a strip is read by about one second for a 15-inch strip. Unlike other commands which reset to a default state after the PR command (see below) or after the menu keys are pressed, a change to the Barcode switch is written into non-volatile memory and will remain in effect until the next change or until the entire unit 10 memory is reset. The unit 10 is shipped from the factory with the Barcode switch enabled.

Response:
  <status code>
Possible Errors:
  None.

Baud Rate Command

Mnemonic:
  BR

Usage:
  ddBR<cr>

Explanation:
This command causes the unit 10 to change its communication (baud) rate. The parameter dd is the two most significant digits (or three digits in the case of 19200 baud) of the desired baud rate divided by two (2), expressed in hexadecimal format. For example, to change the baud rate to 9600 baud, the command 30BR<cr> would be issued. (30 hex=48 decimal=96/2. The unit 10 acknowledges the command before changing its baud rate. If any errors are encountered while processing this command, the baud rate will remain unchanged at its previous value. Allowable baud rates are 1200, 2400, 4800, 9600, and 19200.

Response:
  <status code>
Possible Errors:
  PRM_RANGE_ERROR occurs if the desired baud rate is omitted or is not one of the values specified above.

Configuration Command

Mnemonic:
  CF

Usage:
  ddaaCF<cr> (to set a switch)
  aaCF<cr> (to return the current setting of a switch)

Explanation:
This command permits reading or setting the switches contained in the unit 10. The parameter aa specifies the switch being accessed and the optional parameter dd specifies the new setting for that switch. Omitting the data parameter causes the unit 10 to return the current switch setting. Switches with only two settings (off & on) are treated the same as switches with multiple settings, with each setting being assigned a unique number (in this case, 0=off, and 1=on). Switch numbers and possible settings are as follows:

| Switch | Number | Possible Code | Possible Setting | |
|--------|--------|---------------|------------------|---|
| AXMT | 05 | 00 | off | (axmt) |
|      |    | 01 | on  | (AXMT) |
| DPT  | 06 | 00 | off | (dpt) |
|      |    | 01 | on  | (DPT) |
| SEP  | 07 | 00 | spc | (space) |
|      |    | 01 | com | (comma) |
|      |    | 02 | tab |         |
|      |    | 03 | cr  | (carriage return) |
|      |    | 04 | crlf | (carriage return & line feed) |
| DLIM | 08 | 00 | cr  | (carriage return) |
|      |    | 01 | crlf | (carriage return & line feed) |

-continued

| Switch | Number | Possible Code | Possible Setting | |
|--------|--------|---------------|------------------|---|
| X10 | 0A | 00 | off | (x10) |
|  |  | 01 | on | (X10) |
| DAP | 0B | 00 | off | (dap) |
|  |  | 01 | on | (DAP) |
| M/M | 0C | 00 | off | |
|  |  | 01 | min | |
|  |  | 02 | max | |
|  |  | 03 | m/m | (both min and max) |

Each time the CF command is received by the unit 10 and a switch is modified, the modification is written into non-volatile EEPROM memory (preferably rated for a minimum of 10,000 to 100,000 writes for each byte). The unit 10 firmware compares the desired setting to the current setting and does not write an identical setting into the non-volatile memory. Therefore, it is possible to send the same settings to the unit 10 many times without the risk of wearing out the memory device.

Response:
    <status code>
Possible Errors:
    PRM_RANGE_ERROR results if a non-existent switch is selected or if the parameter (dd) is out of range.
Total Configuration Command
Command:
    TC
Usage:
    muccbbdsTC<cr>
Explanation:
    This command combines the BR command, the BC command, and several options of the CF command into one. It is intended for use with barcodes to allow configuration of the unit without being able to communicate via the serial port. The eight-character parameter string is the hex value of a packed version of the parameters for the commands being combined. The entire command is aborted if any of the parameters have illegal values. The parameters of the combined commands correspond to the fields of the parameter string as follows:

| AXMT | AutoTransmit (05CF) | bit 0 (0x01) of the "cc" byte: 0 => off, 1 => on |
| DPT | Decimal Point (06CF) | bit 2 (0x04) of the "cc" byte: 0 => off, 1 => on |
| SEP | Separator (07CF) | bits 0–2 (0x7) of the "s" nybble: values as in the 07CF command |
| DLIM | Delimiter (08CF) | bits 0–3 (0xF) of the "d" nybble: values as in the 08CF command |
| X10 | Times Ten (0ACF) | bit 5 (0x20) of the "cc" byte: 0 => off, 1 => on |
| DAP | Data After Pass (0BCF) | bit 6 (0x40) of the "cc" byte: 0 => off, 1 => on |
| M/M | Min/Max (0CCF) | bits 2–3 (0xC) of the "m" nybble: values as in the 0CCF command |
| BC | Barcode (BC) | bit 1 (0x02) of the "cc" byte: 0 => disabled, 1 => enabled |
| BR | Baud Rate (BR) | the entire "bb" byte: values as in the BR command |

Note: the "u" nybble is presently unused.

Response:
    <status code>
Possible Errors:
    PRM_RANGE_ERROR occurs if there are not eight hex digits as input parameters for the command, or if any parameter value is illegal.

The above description is that of a preferred embodiment of the invention. Various changes and alterations can be made without departing from the spirit and broader aspects of the invention, which are to be interpreted in accordance with the principles of patent law, including the doctrine of equivalents.

What is claimed is:

1. A color measurement instrument comprising:
    a color measurement means for outputting color signals representative of colors aligned with, and moving with respect to, said color measurement means; and
    a control means coupled to said color measurement means for receiving the color signals, for determining if the color signals correspond to a barcode having a plurality of portions each of a different or unique color, the barcode portions at least partially overlaid, for reading each of the unique barcode portions, for outputting barcode information corresponding to each of the barcode portions if the color signals correspond to a barcode, and for outputting color information if the color signals do not correspond to a barcode.

2. The color measurement instrument of claim 1 where the color information comprises a mathematical representation of the color signals.

3. The color measurement instrument of claim 1 where at least one bit from one barcode portion is overlaid on one bit from another barcode portion.

4. The color measurement instrument of claim 3 further including a display for indicating if the unit has recognized a barcode.

5. The color measurement instrument of claim 4 where the display is an LED.

6. The color measurement instrument of claim 5 where the LED is capable of flashing yellow or green.

7. A color measurement instrument comprising:
    a color measurement means for outputting target signals representative of a color target aligned with, and moving with respect to, said color measurement means; and
    a control means coupled to said color measurement means for receiving the target signals, for determining from the target signals if the target signals correspond to a barcode, for outputting barcode information corresponding to the barcode if the target signals correspond to a barcode, and for outputting color information if the target signals do not correspond to a barcode.

8. The color measurement instrument of claim 7 further comprising:
    means to transmit color information or barcode information to a host computer.

9. The color measurement instrument of claim 8 further comprising:
    recognition means for recognizing a specific sequence from the barcode information.

10. The color measurement instrument of claim 9 further comprising:
    configuration means for configuring the color measurement instrument based upon the specific sequence of barcodes recognized by the recognition means.

11. The color measurement instrument of claim 10 comprising a mechanical distance feedback mechanism.

12. The color measurement instrument of claim 11 where the mechanical distance feedback mechanism comprises a rotary encoder.

13. The color measurement instrument of claim 12 where the target signals comprise a magenta signal, a cyan signal, and a yellow signal.

14. A method of operating a color instrument comprising:

scanning a color target containing colors;

producing color signals representative of the colors;

determining from the color signals if the color signals correspond to a first barcode having a first color;

if so, outputting barcode information corresponding to the first barcode; and if not, outputting color information.

15. The method of claim 14 further comprising:

determining from the color signals if a second barcode exists for a second color; and, if so, outputting barcode information corresponding to the second barcode.

* * * * *